UNITED STATES PATENT OFFICE.

MAX WALLERSTEIN, OF NEW YORK, N. Y.

COMPOSITION OF MATTER FOR USE IN PREPARING FERMENTED BEVERAGES.

No. 908,630.             Specification of Letters Patent.           Patented Jan. 5, 1909.

Application filed March 26, 1908. Serial No. 423,382.

*To all whom it may concern:*

Be it known that I, MAX WALLERSTEIN, a citizen of the United States, residing at New York, in the county of New York and State of New York, have invented certain new and useful Improvements in Composition of Matter for use in Preparing Fermented Beverages, of which the following is a specification.

This invention relates to a composition of matter intended for the preparation of solutions adapted for the production of fermented beverages, more particularly for the preparation of brewing waters.

It is well known that waters of certain districts are specially adapted for the production of ales and beers having peculiar and characteristic qualities. Thus the water of Burton-on-Trent has long been renowned for yielding excellent pale ales, and the waters of Munich and Dortmund produce excellent beers. In other districts waters are found which are admirably adapted for special and characteristic purposes. Upon investigation it has been found that the chemical composition of the brewing water bears a constant relation to the results obtained. For instance, the waters of Burton are found to contain relatively large amounts of calcium salts, mostly calcium sulfate, and their excellence for the production of that particular class of ales for which this district is famous is largely attributable to the presence of these salts in the brewing water.

Attempts have been made to reproduce the peculiar effects of the Burton and other waters, by adding to other natural waters the indicated ingredients required to imitate the chemical composition; but such efforts have been invariably unsatisfactory. Thus, efforts have been made to imitate the Burton ales by the addition to the waters used in brewing of definite proportions of plaster of paris. Plaster of paris, however, is usually very impure and extremely variable in character, so that even if uniform quantities of plaster of paris were added, varying amounts of calcium sulfate would go into solution. The amount of calcium sulfate contained in ordinary plaster of paris of commerce is often not higher than 72-80%, and it therefore contains up to 28% of impurities, among which even such salts as calcium fluorid and other materials prejudicial to the brewing process are found. It is evident that such material is absolutely unfit for the described purposes. Furthermore, mechanical difficulties arise, owing to the high density and the slow rate of solution of plaster of paris. If added in the cold or hot water tank it settles quickly to the bottom and leaves a residue which is highly prejudicial in subsequent operations. It has also been proposed, in order to imitate these waters, to add to the waters used for brewing, a pure calcium sulfate. But, by reason of the interference of this salt, in its commercial form, with the subsequent operations, due to its slow rate of solution, its use has not met with favor. Even pure precipitated calcium sulfate will, when stored, form very hard lumps which, once formed, are extremely difficult to dissolve.

I have discovered that ales and beers of peculiar excellence may be produced without interference with the normal brewing process by adding to the water to be employed in their preparation proper proportions of pure precipitated calcium sulfate, added to the water in the form of previously prepared pulverulent, non-lumping mixtures of precipitated calcium sulfate with various other salts as hereinafter described. This procedure affords many advantages, and greatly improves the process of treating brewing water.

I prefer to use a substantially uniform pulverulent mixture consisting of approximately 75 parts of precipitated calcium sulfate, 20 parts of potassium chlorid, and 5 parts of magnesium sulfate. If the composition of the water to be treated is such that other salts are also required, the same are added to this mixture, and the composition of the mixture changed accordingly. For instance, if the water contains sodium sulfate, which has an unfavorable effect, this can be changed by the addition of calcium chlorid into calcium sulfate and sodium chlorid, both of which are of benefit throughout the brewing process. Or if the water is very rich in magnesium carbonate, the same also can be changed by the addition of calcium chlorid, forming calcium carbonate and magnesium chlorid. The use of such a compound has many advantages, among which the following may be enumerated:

(1) Only pure precipitated calcium sulfate is used, assuring that a definite proportion of calcium sulfate passes into solution in each case.

(2) The mixing of the pure precipitated calcium sulfate with the other salts, and particularly with the alkali metal chlorid, as described, prevents the lumping of the calcium sulfate during storage, and thereby overcomes the difficulties which arise when lumps are formed. In this respect precipitated calcium sulfate is distinguished from gypsum, which sets into a hard mass when exposed to atmospheric moisture.

(3) Potassium chlorid greatly increases the rate of solution of the calcium sulfate; not only is calcium sulfate more soluble in the presence of potassium chlorid, but it also dissolves much more rapidly.

(4) The presence of potassium chlorid is very beneficial to the fermentation. It improves the quality of the yeast, strengthens its fermenting power, and thereby insures pure fermentations. The magnesium sulfate has also been found to be very favorable for the fermentation. The potassium chlorid may be partly or wholly substituted by other alkali metal chlorids, as sodium chlorid. The proportion of alkali metal chlorid may be less than 20% by weight of the mixture, but is preferably in all cases in excess of 10%, as a smaller proportion is found to be relatively inefficient in preventing the lumping of the stored mixture and in promoting the solution of the calcium sulfate.

I claim:

1. The herein described composition of matter for use in preparing fermented beverages, comprising a pulverulent non-lumping mixture containing pure precipitated calcium sulfate, uniformly commingled with an alkali metal chlorid.

2. The herein described composition of matter for use in preparing fermented beverages, comprising a pulverulent non-lumping mixture containing pure precipitated calcium sulfate, uniformly commingled with potassium chlorid.

3. The herein described composition of matter for use in preparing fermented beverages, comprising a pulverulent non-lumping mixture containing pure precipitated calcium sulfate, uniformly commingled with potassium chlorid and magnesium sulfate.

4. The herein described composition of matter for use in preparing fermented beverages, comprising a pulverulent non-lumping mixture containing pure precipitated calcium sulfate, uniformly commingled with an alkali metal chlorid, the latter in excess of 10% by weight of the mixture.

5. The herein described composition of matter for use in preparing fermented beverages, comprising a pulverulent non-lumping mixture containing ingredients in the approximate proportions, calcium sulfate 75%, potassium chlorid 20% and magnesium sulfate 5%.

In testimony whereof, I affix my signature in presence of two witnesses.

MAX WALLERSTEIN.

Witnesses:
Wm. Victor Goldberg,
Charles T. Cowenhoven, Jr.